United States Patent
Abadi et al.

(10) Patent No.: US 10,001,543 B1
(45) Date of Patent: Jun. 19, 2018

(54) METHODS AND SYSTEMS FOR NOISE REMOVAL IN INDOOR POSITIONING

(71) Applicant: International Business Machines Corporation, Armink, NY (US)

(72) Inventors: Aharon Abadi, Petach Tikva (IL); Roie Melamed, Haifa (IL); Natalie Shapira, Moshav Hadid (IL)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/421,446

(22) Filed: Feb. 1, 2017

(51) Int. Cl.
*H04W 24/00* (2009.01)
*G01S 5/02* (2010.01)
*H04W 4/02* (2018.01)
*H04W 84/12* (2009.01)

(52) U.S. Cl.
CPC .............. *G01S 5/021* (2013.01); *H04W 4/027* (2013.01); *H04W 4/028* (2013.01); *H04W 84/12* (2013.01)

(58) Field of Classification Search
CPC ........ G01S 5/021; H04W 4/027; H04W 4/028
See application file for complete search history.

(56) References Cited

U.S. PATENT DOCUMENTS

| 9,146,299 | B2 | 9/2015 | Chao et al. | |
|---|---|---|---|---|
| 2005/0096841 | A1* | 5/2005 | Gedik | G06F 17/30333 701/408 |
| 2012/0094683 | A1* | 4/2012 | Yoeli | G01S 5/0027 455/456.1 |
| 2014/0378171 | A1* | 12/2014 | Rudow | H04W 64/00 455/456.6 |
| 2015/0234033 | A1 | 8/2015 | Jamieson et al. | |

FOREIGN PATENT DOCUMENTS

WO 2014113882 7/2014

* cited by examiner

*Primary Examiner* — Wayne H Cai

(57) ABSTRACT

A computerized method of improving position measurement of an indoor positioning system (IPS), comprising: gathering a plurality of position samples of a mobile device measured by an indoor wireless device, each of the position samples is indicative of a measured position and a measurement time; estimating a movement direction of the mobile device from the plurality of position samples; receiving a current position sample of the mobile device; estimating a temp movement direction of the mobile device from at least one of the plurality of position samples and the current position sample; and when the temp movement direction is identified as false, marking the current position sample as noise.

14 Claims, 3 Drawing Sheets

METHODS AND SYSTEMS FOR NOISE REMOVAL IN INDOOR POSITIONING

BACKGROUND

The present invention, in some embodiments thereof, relates to accuracy of indoor positioning and, more particularly, but not exclusively, to cleaning position measurements by trajectory calculation.

Indoor positioning systems (IPS) provide online detection capabilities for localizing mobile devices. An IPS can locate mobile devices inside a building using radio waves, magnetic fields, acoustic signals, and/or other sensory information collected by mobile devices. In recent years, radio waves-based IPS systems have become very popular as they can locate smartphones by tracking the device's Wi-Fi or BLE (Bluetooth Low Energy) signals. Together with mobile, this position tracking can be leveraged to support high-value services such as indoor location based analytics (e.g., understanding customer traffic), real-time engagements (e.g., sending the customer a mobile coupon for a shirt when the customer is standing near it), asset management (e.g., tracking medical equipment in hospitals) and indoor navigation (e.g., in hospitals and malls). These services and solutions can transform the user experience for customers in the retail and travel and transportation domains.

The most popular indoor localization systems use Wi-Fi-based technologies since they can be based on existing Wi-Fi networks, which are widely available and do not require the device or person to take action such as opting-into the sensing or installing a mobile application.

SUMMARY

According to an aspect of some embodiments of the present invention there is provided a computerized method of improving position measurement of an indoor positioning system (IPS), comprising: gathering a plurality of position samples of a mobile device measured by an indoor wireless device, each of the position samples is indicative of a measured position and a measurement time; estimating a movement direction of the mobile device from the plurality of position samples; receiving a current position sample of the mobile device; estimating a temp movement direction of the mobile device from at least one of the plurality of position samples and the current position sample; and when the temp movement direction is identified as false, marking the current position sample as noise.

Optionally, the estimating a temp movement direction is based on two latest of the plurality of position samples.

Optionally, the at least one of the plurality of position samples is a latest of the plurality of position samples.

Optionally, the indoor wireless device is a Wi-Fi access point device.

Optionally, the method further comprises: calculating a direction difference between the temp movement direction to the movement direction; and when the direction difference is small, identifying the temp movement direction as true and updating the movement direction to be the temp movement direction.

Optionally, the method further comprises, when the direction difference is large: receiving a next position sample of the mobile device; estimating a next temp movement direction of the mobile device from at least one of the plurality of position samples and the next position sample; and calculating a new direction difference between the temp new movement direction to the movement direction; and when the new direction difference is small, identifying the temp movement direction as false.

Optionally, the method further comprises: calculating a time difference between a measurement time of a latest of the plurality of position samples and a measurement time of the current position sample; when the time difference is longer than a predetermined maximal difference, updating the movement direction to be the temp movement direction.

Optionally, the method further comprises: estimating a movement velocity of the mobile device from the plurality of position samples and the current position sample; when the movement velocity is higher than a predetermined maximal velocity, marking the current position sample as noise.

More optionally, the method further comprises: when the movement velocity is lower than a predetermined maximal velocity, adding the current position sample to the dataset.

More optionally, the estimating is based on an inaccuracy radius of the indoor wireless device.

More optionally, the maximal velocity is determined based on an average walking speed of a person.

Optionally, the current position sample marked as noise is added to a noise history list.

According to some embodiments of the invention there is provided a computer readable medium comprising computer executable instructions adapted to perform the method.

According to an aspect of some embodiments of the present invention there is provided a system of improving position measurement of an indoor positioning system (IPS), comprising: an indoor wireless device for measuring a plurality of position samples of a mobile device, each of the position samples is indicative of a measured position and a measurement time; a dataset for storing the plurality of position samples; and a processor for: estimating a movement direction of the mobile device from the plurality of position samples; estimating a temp movement direction of the mobile device from at least one of the plurality of position samples and a current position sample of the mobile device; and when the temp movement direction is identified as false, marking the current position sample as noise.

According to an aspect of some embodiments of the present invention there is provided a software program product for improving position measurement of an indoor positioning system (IPS), comprising: a non-transitory computer readable storage medium; a dataset for storing a plurality of position samples of a mobile device measured by an indoor wireless device, each of the position samples is indicative of a measured position and a measurement time; first program instructions for estimating a movement direction of the mobile device from the plurality of position samples; second program instructions for receiving a current position sample of the mobile device; third program instructions for estimating a temp movement direction of the mobile device from at least one of the plurality of position samples and the current position sample; and fourth program instructions for marking the current position sample as noise when the temp movement direction is identified as false; wherein the first, second, third and fourth program instructions are executed by at least one computerized processor from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
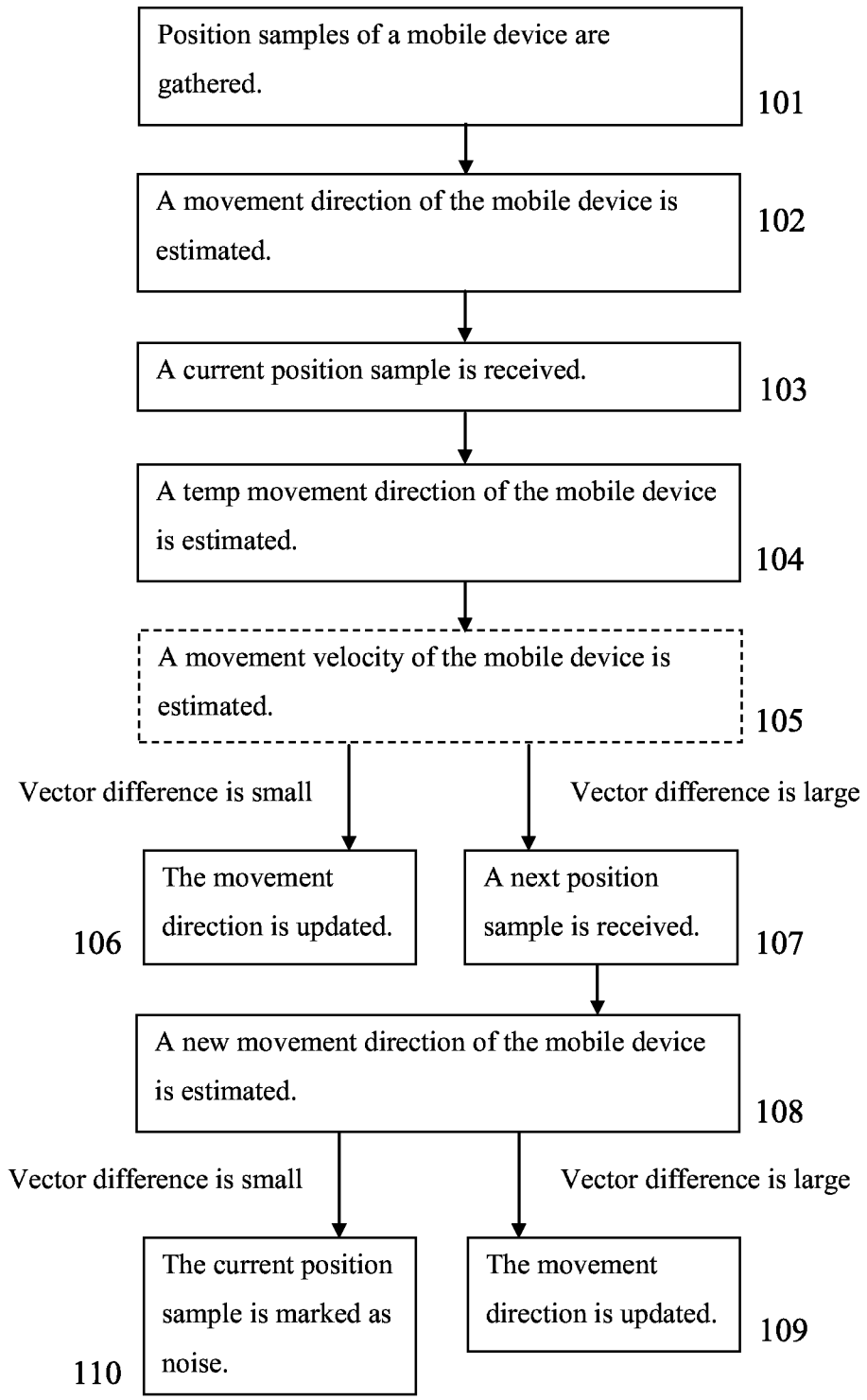
FIG. 1 is a flowchart schematically representing a method for improving position measurement of an indoor positioning systems (IPS), according to some embodiments of the present invention.

The present invention, in some embodiments thereof, relates to accuracy of indoor positioning and, more particularly, but not exclusively, to cleaning position measurements by trajectory calculation.

Compared to outdoor positioning, indoor positioning is inherently more complex and less accurate for two main reasons. First, in an indoor venue, the signals are attenuated and scattered by static obstacles such as walls and "dynamic obstacles" such as people. This is different from outdoors, where the lines of sight from the GPS satellites are usually visible. Second, in an indoor venue there is typically no fixed network of roads, unlike the outdoor roads network that may be leveraged (e.g., by navigation applications applying snap-to-grid methods) to achieve high positioning accuracy. These challenges motivate the use of data cleansing to improve the accuracy of indoor position data.

According to some embodiments of the present invention, there are provided methods and systems of removing IPS noise. A trajectory analysis is done, of a given sequence of position samples. For any time point the direction of the trajectory is calculated based of last position samples. Samples that are not aligned with the direction calculated for time points before and after, are removed from the sequence and reported as a noise. A temp direction is estimated for each new sample, when the direction is very different from the direction of previous samples, the next sample(s) is examined to see whether the trajectory is truly changed or the new sample is noise.

Optionally, for any new position sample, an estimated movement velocity of the mobile device is estimated based on previous position sample(s). When the estimated movement velocity is larger than a reasonable movement velocity, the new position sample is removed or disregarded as noise.

Optionally, position samples marked as noise are added to separate noise history list, to allow restoration of wrongly identified noise samples.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
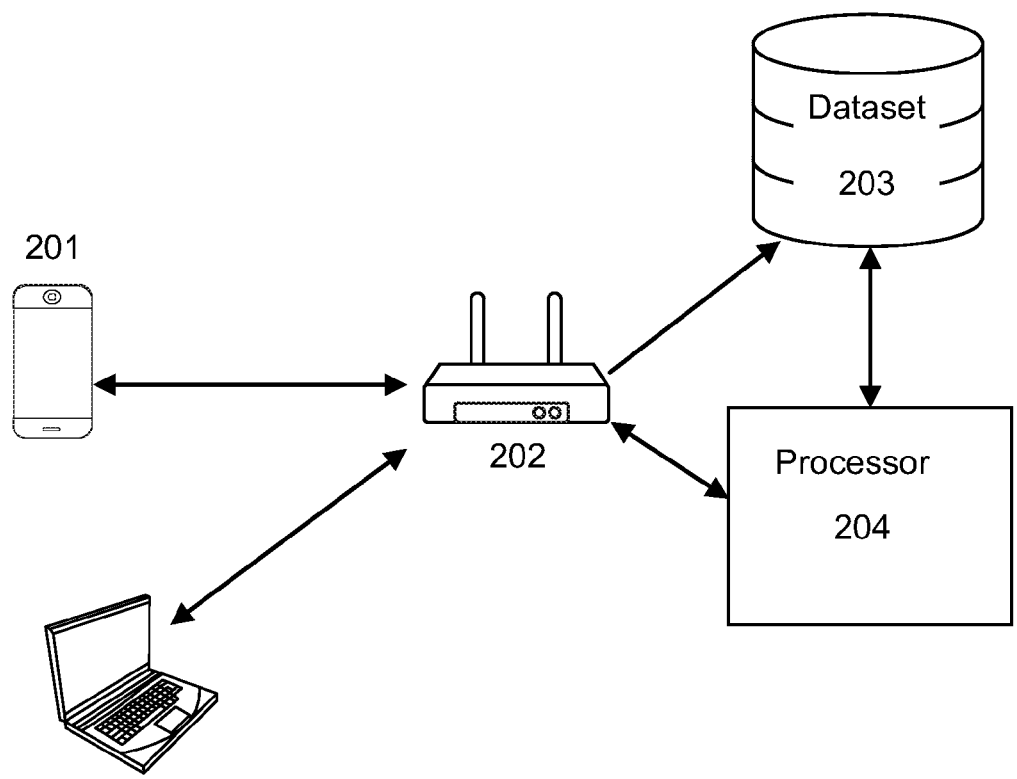
FIG. 2 is a schematic illustration of a device/system of improving position measurement of an IPS, according to some embodiments of the present invention.

Referring now to the drawings, FIG. 1 is a flowchart schematically representing a method for improving position measurement of an IPS, according to some embodiments of the present invention. Reference is also made to FIG. 2, which is a schematic illustration of a device/system of improving position measurement of an IPS, according to some embodiments of the present invention.

First, as shown at 101, position samples of a mobile device 201 measured by an indoor wireless device 202 are gathered. Each of the position samples includes a measured position and a measurement time.

Mobile device 201 may include, for example, a smartphone, a tablet, a wearable device such as Google glass, a Smart watch, a laptop computer, and/or any electronic device that includes transmission device, such as Wi-Fi communication device.

Indoor wireless device 202 may include, for example, a Wi-Fi AP device, a Wi-Fi router and/or any other IPS or device having IPS capabilities.

Optionally, the position samples are stored in a dataset 203. Dataset 203 may be any kind of structured data collection that allows access to stored data and may be stored, for example, in a digital data storage unit such as a magnetic drive and/or a solid state drive. Dataset 203 may be included in indoor wireless device 202 or may operate separately.

A computerized processor 204 executes instructions to perform the method from a non-transitory computer readable storage medium. Processor 204 and/or the storage medium may be included in indoor wireless device 202 or may be included in a separate device. For example, processor 204 and/or the storage medium may be part of a personal computer, a workstation, a mobile device, a server which may include one or more computing devices, and/or any other computer device. Processor 204 and/or the storage medium may be connected to indoor wireless device 202 via a network, for example local area network (LAN), a wireless network such as mobile network, wireless local area network (WLAN) such as Wi-Fi, a wireless personal area network (WPAN) such as Bluetooth protocol and/or any other network.

Then, as shown at 102, a movement direction of mobile device 201 is estimating from the position samples. This may be done by calculating the vector, for example between the measured positions of the two last position samples, noted $(X_1, Y_1)$ and $(X_2, Y_2)$. The vector is then represented by $(X_2-X_1, Y_2-Y_1)$. The direction is then $\tan^{-1} Y_2-Y_1/X_2-X_1$.

Then, as shown at 103, a current position sample of mobile device 201 is received by a transmitter and forwarded to processor 204 and/or dataset 203.

Then, as shown at 104, a temp movement direction of mobile device 201 is estimated from the position samples and the current position sample.

Optionally, a time difference between the measurement time of a latest of the position samples and a measurement time of the current position sample is calculated. When the time difference is longer than a predetermined maximal time difference the position samples are considered obsolete and the current position sample is regarded as true. The predetermined maximal time difference may be for example 1 minute. The predetermined maximal time difference may also be configurable, for example between 3 seconds and 3 minutes, or any other range. The estimating movement direction of mobile device 201 is then updated to be equal to the temp movement direction.

When the difference between the movement direction and the temp movement direction is small, the current position sample is identified as true and the estimating movement direction of mobile device 201 is updated, to be equal to the temp movement direction, as shown at 106.

When the difference between the movement direction and the temp movement direction is large, a next position sample is received, as shown at 107, and a new direction according to the next position samples is estimated, as shown at 108.

When the difference between the movement direction and the new movement direction is large, it is concluded that the movement direction of mobile device 201 is changed. The temp movement direction is then identified as true and the estimating movement direction of mobile device 201 is updated, to be equal to the temp movement direction, as shown at 109.

When the difference between the movement direction and the new movement direction is small, it is concluded that the movement direction of mobile device 201 is not changed. The temp movement direction is then identified as false and the current position sample is marked as noise, as shown at 110.

Figure 3:
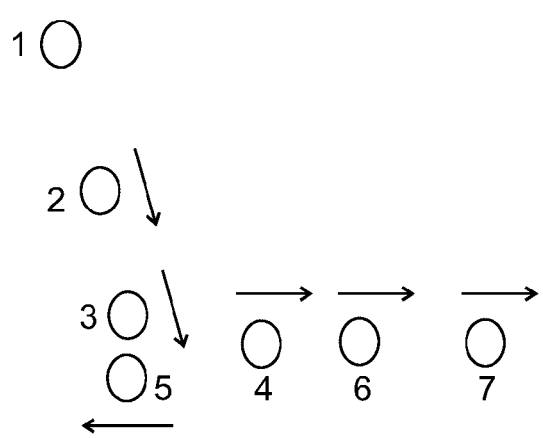
FIG. 3 is an illustration of a set of exemplary measured positions of IPS samples, according to some embodiments of the present invention.

Reference is now made to FIG. 3, which is an illustration of a set of exemplary measured positions of IPS samples, according to some embodiments of the present invention. The mobile device represented by this set is moving down (samples 1,2,3) and then right (samples 4,6,7). At the time of sample 5 the temp direction is to the right. The direction to the right represents the movement from sample 3 to sample 4 and from sample 4 to sample 6. However the temp direction from sample 4 to 5 is to the left. Hence sample 5 is not aligned with the general direction and reported as noise.

Optionally, as shown at 105, a movement velocity of mobile device 201 is estimated from at least one previous position sample and the current position sample, so the current position sample is checked for being a noise sample. For example, a simple mathematical formulation may be as follows: suppose $S_1$ and $S_2$ denote consecutive samples received at times $t_1$ and $t_2$, respectively. Then the movement velocity may be: $(S_1-S_2/(t_2-t_1))$.

When the movement velocity is higher than a predetermined maximal velocity, the current position sample is marked as noise. It is assumed that mobile device 201 may not travel faster than the predetermined maximal velocity. Therefore, when such a velocity is calculated, it is concluded that the later sample is noise. The current position sample may then be deleted or stored, for example in a separate dataset.

Optionally, when the movement velocity is lower than a predetermined maximal velocity, the current position sample is added to dataset 203.

A Wi-Fi-based positioning system has an inherent positioning inaccuracy. Hence, vendors define an inaccuracy radius R of about 3 to 5 meters for a given device, wherein at least 75% of the position samples are within an inaccuracy disk/circle whose center is the device's coordinates $(X_i, Y_i)$ and its radius is R. The disk may then be denoted by $D=((X_i, Y_i), R)$. A position sample that is within D is considered as a valid and one outside D is considered a noisy sample. However, in a commercial deployment such as a shopping mall, for dynamic devices such as smartphones, the sensing system may not infer whether a sample is noisy based on the disk alone, since the exact positioning of the device is unknown, therefore a noise filtering method as described below is required.

Optionally, a more complex model may be applied. Assume that at time $t_i$ a mobile device DEVICE is at coordinates $(X_i,Y_i)$. A position sample $P_i$ received at this time may be anywhere within $D=((X_i,Y_i),R)$ and still considered a valid (i.e., not noise) sample. Assume that the subsequent position sample $P_j$ with coordinates $(X_j, Y_j)$ is received at a time $t_j>t_i$. Assume also that $P_i$ is a valid sample and that each mobile device may move at a velocity lower than or equal to S kilometers per hour (kph) (i.e. S is the upper bound on the velocity at which a mobile device is "allowed" to move). According to the latter assumption, the Euclidean distance between $P_i$ and $P_j$ is denoted as Distance$_{i,j}$ divided by the time gap between these two samples $(t_j-t_i)$ should be $\leq S$. However, the reported $P_i$ and $P_j$ coordinates may drift by at most R meters in both the X and Y directions yet still be considered valid samples. Hence, the above velocity condition is relaxed to include a drift of up to R meters from each sample, i.e., Distance$_{i,j}-2R/t_j-t_i \leq S$. When this condition is not met, $P_j$ is classified as a noisy sample. Optionally, the assumption that $P_i$ is a valid sample is relaxed by replacing it with the average position calculated by smoothing.

For parameter settings, R is typically set to be "a little bit less" than the claimed inaccuracy radius defined by the vendor, e.g., 2.5 meters. S is also typically set as the average walking speed of a person, which is around 4.5 kph. These conservative values are used for the following reasons: First, in the above velocity condition 2R is subtracted from the "allowed" distance between $P_i$ and $P_j$. This subtraction implies the worst case (and not common) scenario in which both $P_i$ and $P_j$ drift (from a positioning perspective) by R meters to exactly opposing directions, whereas typically the combined drift is less than 2R. Second, mobile devices are carried by people, who usually do not walk in straight lines. Moreover, in an indoor venue most of the devices/people are static or "semi-static" for long periods. These two arguments imply an effective smaller inaccuracy radius and allowed velocity.

Optionally, position samples marked as noise are added to separate noise history list. This is done for two reasons: first, there is a small probability that this sample is actually a valid one mistakenly classified by the algorithm as a noisy sample; and second, a person (device) may exceed the maximal speed, for example in a multi-floor venue by using the elevator. Such a classification error may cause the algorithm to also classify subsequent samples as noisy ones, since a valid sample was eliminated from the data. To overcome such cases, when the head of the noise history list is of a size of a noise threshold, the samples history list is set to the noise history list head and the new samples history is used while emptying the noise history list.

Figure 4:
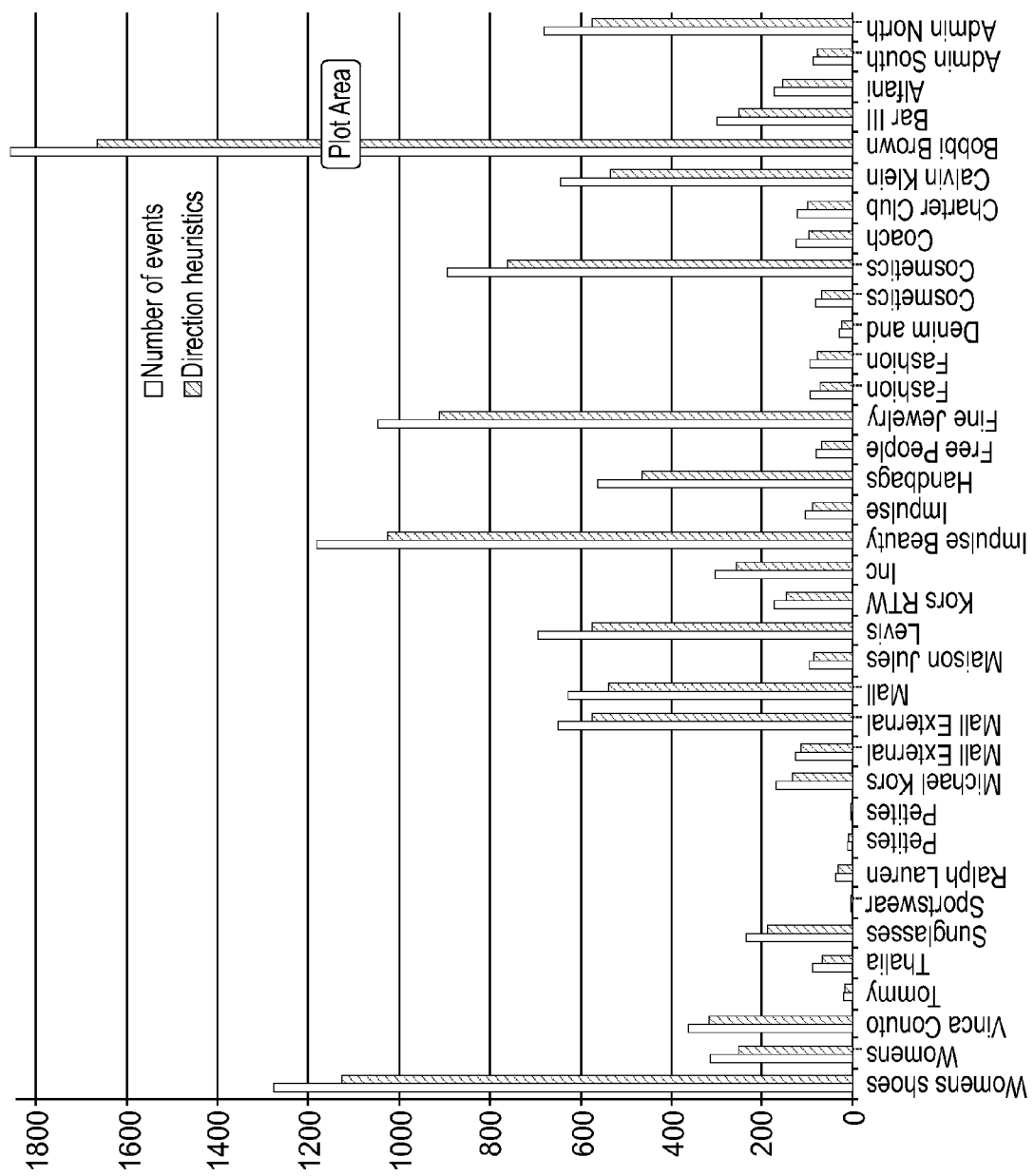
FIG. 4 is a graph showing the number of position samples before and after identifying samples as noise, according to some embodiments of the present invention.

To evaluate the performance of the method according to some embodiments of the present invention, empirical evaluation was made. Reference is now made to FIG. 4, which is a graph showing the number of position samples before and after identifying samples as noise, according to some embodiments of the present invention. The difference between the heights of the two columns of each source represents the number of position samples identified as noise by being inconsistent in direction, showing the improvement in sample quality.

The methods as described above may be used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant IPSs will be developed and the scope of the term IPS is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of improving position measurement of an indoor positioning system (IPS), comprising:
   gathering a plurality of position samples of a mobile device measured by an indoor wireless device, each of said position samples is indicative of a measured position and a measurement time;
   estimating a movement direction of said mobile device from said plurality of position samples;
   receiving a current position sample of said mobile device;
   estimating a movement velocity of said mobile device from said plurality of position samples and said current position sample;
   when said movement velocity is higher than a predetermined maximal velocity, marking said current position sample as noise;
   estimating a temp movement direction of said mobile device from at least one of said plurality of position samples and said current position sample; and
   when said temp movement direction is identified as false, marking said current position sample as noise.

2. The method of claim 1, wherein said estimating a temp movement direction is based on two latest of said plurality of position samples.

3. The method of claim 1, wherein said at least one of said plurality of position samples is a latest of said plurality of position samples.

4. The method of claim 1, wherein said indoor wireless device is a Wi-Fi access point device.

5. The method of claim 1, further comprising:
   calculating a direction difference between said temp movement direction to said movement direction; and
   when said direction difference is small, identifying said temp movement direction as true and updating said movement direction to be said temp movement direction.

6. The method of claim 1, further comprising when said direction difference is large:
   receiving a next position sample of said mobile device;

estimating a next temp movement direction of said mobile device from at least one of said plurality of position samples and said next position sample; and calculating a new direction difference between said temp new movement direction to said movement direction; and when said new direction difference is small, identifying said temp movement direction as false.

7. The method of claim 1, further comprising:

calculating a time difference between a measurement time of a latest of said plurality of position samples and a measurement time of said current position sample;

when said time difference is longer than a predetermined maximal difference, updating said movement direction to be said temp movement direction.

8. The method of claim 1, further comprising:

when said movement velocity is lower than a predetermined maximal velocity, adding said current position sample to said dataset.

9. The method of claim 1, wherein said estimating is based on an inaccuracy radius of said indoor wireless device.

10. The method of claim 1, wherein said maximal velocity is determined based on an average walking speed of a person.

11. The method of claim 1, wherein said current position sample marked as noise is added to a noise history list.

12. A non-transitory computer readable medium comprising computer executable instructions adapted to perform the method of claim 1.

13. A system of improving position measurement of an indoor positioning system (IPS), comprising:

an indoor wireless device for measuring a plurality of position samples of a mobile device, each of said position samples is indicative of a measured position and a measurement time;

a dataset for storing said plurality of position samples; and a processor for:

estimating a movement direction of said mobile device from said plurality of position samples;

estimating a temp movement direction of said mobile device from at least one of said plurality of position samples and a current position sample of said mobile device;

when said temp movement direction is identified as false, marking said current position sample as noise;

estimating a movement velocity of said mobile device from said plurality of position samples and said current position sample; and when said movement velocity is higher than a predetermined maximal velocity, marking said current position sample as noise.

14. A software program product for improving position measurement of an indoor positioning system (IPS), comprising:

a non-transitory computer readable storage medium;

a dataset for storing a plurality of position samples of a mobile device measured by an indoor wireless device, each of said position samples is indicative of a measured position and a measurement time;

first program instructions for estimating a movement direction of said mobile device from said plurality of position samples;

second program instructions for receiving a current position sample of said mobile device;

third program instructions for estimating a temp movement direction of said mobile device from at least one of said plurality of position samples and said current position sample;

fourth program instructions for marking said current position sample as noise when said temp movement direction is identified as false;

fifth program instructions for estimating a movement velocity of said mobile device from said plurality of position samples and said current position sample;

sixth program instructions for marking said current position sample as noise when said movement velocity is higher than a predetermined maximal velocity; and wherein said first, second, third fourth, fifth, and sixth program instructions are executed by at least one computerized processor from said non-transitory computer readable storage medium.

\* \* \* \* \*